US009397961B1

(12) United States Patent
Bailey

(10) Patent No.: US 9,397,961 B1
(45) Date of Patent: Jul. 19, 2016

(54) METHOD FOR REMAPPING OF ALLOCATED MEMORY IN QUEUE BASED SWITCHING ELEMENTS

(71) Applicant: PMC-Sierra US, Inc., Sunnyvale, CA (US)

(72) Inventor: Patrick Neil Bailey, Port Coquitlam (CA)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 308 days.

(21) Appl. No.: 14/032,557

(22) Filed: Sep. 20, 2013

Related U.S. Application Data

(60) Provisional application No. 61/704,396, filed on Sep. 21, 2012.

(51) Int. Cl.
*H04L 12/861* (2013.01)
*H04L 12/879* (2013.01)
*H04L 12/935* (2013.01)

(52) U.S. Cl.
CPC .......... *H04L 49/9005* (2013.01); *H04L 49/30* (2013.01); *H04L 49/3036* (2013.01); *H04L 49/901* (2013.01)

(58) Field of Classification Search
None
See application file for complete search history.

(56) References Cited

U.S. PATENT DOCUMENTS

| 6,076,112 A * | 6/2000 | Hauser | G06F 15/17375 |
| | | | 709/234 |
| 7,397,815 B2 | 7/2008 | Gupta et al. | |
| 8,255,644 B2 | 8/2012 | Sonnier et al. | |
| 2002/0075882 A1* | 6/2002 | Donis | H04L 49/205 |
| | | | 370/412 |
| 2006/0292292 A1* | 12/2006 | Brightman | H04L 49/10 |
| | | | 427/66 |
| 2008/0270676 A1* | 10/2008 | Bekooij | G06F 12/023 |
| | | | 711/100 |
| 2008/0279207 A1* | 11/2008 | Jones | H04L 12/5693 |
| | | | 370/412 |
| 2008/0301256 A1* | 12/2008 | McWilliams | G06F 12/0284 |
| | | | 709/214 |
| 2013/0315054 A1* | 11/2013 | Shamis | H04L 47/58 |
| | | | 370/225 |

FOREIGN PATENT DOCUMENTS

EP 1720295 7/2009

* cited by examiner

*Primary Examiner* — Bunjob Jaroenchonwanit
(74) *Attorney, Agent, or Firm* — Dennis R. Haszko

(57) ABSTRACT

A method of remapping allocated memory in a queue based switching element having first and second memory elements each allocated to a first port pair. An unallocated block of memory is identified in the first memory element as a candidate block, and an allocated block of memory is identified in the second memory element as a target block. Block information is copied from the target block to the candidate block, and the candidate block is maintained as unallocated. In response to a determination that read and write pointers are in a suitable position for a remapping operation, the candidate block is allocated and the target block is deallocated so that the second memory element becomes unallocated and available for reallocation to a second port pair.

21 Claims, 13 Drawing Sheets

METHOD FOR REMAPPING OF ALLOCATED MEMORY IN QUEUE BASED SWITCHING ELEMENTS

CROSS REFERENCE TO RELATED APPLICATIONS

This application claims the benefit of priority of U.S. Provisional Patent Application No. 61/704,396 filed Sep. 21, 2012, which is incorporated herein by reference in its entirety.

FIELD

The present disclosure relates to data networking applications, including but not limited to switch fabrics, network switch elements, packet buffers, storage queues, dynamic memory allocation and memory management.

BACKGROUND

Switching elements have the ability to receive data from multiple sources and to transmit such data to multiple destinations. Each source communicates to a switching element through an ingress interface (also called ingress port on the switching element). A switching element transmits data to each destination by driving its egress interface (also called egress port).

FIG. 1 illustrates a switching element having 4 ingress ports and 4 egress ports. Certain types of switching elements are referred to as fully-connected switches while others are referred to as partially-connected switches. A fully-connected switch, such as illustrated in FIG. 1, can direct data from any ingress port to any egress port. A full-connected switch with equal number of ingress and egress ports, where N is the number of ingress ports, will have $N^2$ possible paths from ingress port to egress port.

Each path or connection from ingress port to egress port can be referred to as a "port pair". For example: a switching element with 4 ingress and 4 egress ports will have a total of 16 possible port pairs. FIG. 1 also illustrates the port pair connections of a fully connected switching element having 4 ingress ports and 4 egress ports.

Typically, a data source connected to a single ingress port can generate multiple unique streams of data. Each stream of data can be tagged with a channel number by the source. A channelized switching element can direct individual channels on an ingress port to a particular channel of an egress port. This is similar to sending data with a source address and a destination address.

FIG. 2 illustrates a switching element with active channels driving ingress ports, queue elements that store data in transit to an egress channel of an egress port. Most switching elements are required to store received data until the data is transmitted to the egress ports. The received data is typically stored in queues within the switching element, as shown in FIG. 2. Because the data is channelized, each channel of data requires a queue. For example: a switching element with 4 ingress, 4 egress ports, and each ingress and egress port supports 128 channels. The switching element will contain 16*128 individual queues (one queue per channel, per port pair).

Within a switching element, each queue can be referred to as a queue element. Each of the queue elements requires a predetermined amount of storage, or memory, for holding the channel data while in transit from ingress to egress port. The amount of storage a queue element requires is dependent on the characteristics of the data stream. Therefore, not all queue elements require the same amount of storage. Many methods of allocating storage to queue elements are known. One method includes providing dedicated storage for each queue element, while other methods share storage across all the queue elements. For shared storage methods, storage is allocated and de-allocated dynamically as needed. Some methods of dynamic storage allocation allocate memory when a channel is activated (also called provisioning a channel), and de-allocate memory when a channel is de-activated (also called de-provisioning a channel). More complex methods of dynamic storage allocation allocate memory when data arrives at a particular queue and then de-allocate storage as the data exits the queue and is transmitted to the egress port.

Regardless of the method for allocating storage to queue elements, each port pair with one or more active channels must be allocated at least one physical memory element. A port pair with a newly activated channel, and no channel currently active on the port pair, needs a completely empty and dedicated physical memory element, such as a random access memory (RAM) in order to be allocated. In general: a) memory elements cannot be shared between port pairs, as individual memory elements, also called pages, are allocated to individual port pairs; and b) a block of memory cannot be shared between queues, as individual blocks are allocated to individual queues.

For example: a switching element with 16 active port pairs must therefore include a minimum of 16 physical memory elements. An active port pair is defined as a port pair with one or more active channels. The storage available within a memory element is shared either dynamically or statically amongst the queue elements of the port pair. In some examples a switching element with 16 port pairs may have only 1 active channel on a single port pair; depending on the traffic profile of that channel the queue element servicing the channel could require multiple memory elements.

The smallest amount of storage that can be allocated to a queue is typically called a block of memory, or simply a block. Within a memory element, there are multiple blocks of memory available for allocation to queue elements. A single memory element, such as a RAM, is referred to as a page of memory. In this context, the total amount of memory available for all queue elements is equal to the number of pages and these pages are made of blocks.

FIG. 3 illustrates a switch element with 16 memory elements, each port pair having 1 memory element allocated thereto. In this example, every port pair could support an active channel. In the example of FIG. 3, the maximum number of channels that could be supported for each port pair is equal to the number of blocks within each individual memory element.

FIG. 4 illustrates a switch element with 16 memory elements in which a single port pair is allocated all available memory elements. In this example, only port pair 3-3 (ingress-egress port) could support an active channel. In the example of FIG. 4, the maximum number of channels that could be supported for port pair 3-3 is equal to the total number of blocks within all memory elements.

In switching elements with dynamic memory allocation, when no channels are active, every block of memory is unallocated and therefore every page of memory is also unallocated. As the first channel is activated, the switching element, which could be hardware or software controlled, allocates a memory element to the port pair and also allocates a block within that memory element to the queue element servicing the channel.

One method to track allocated blocks is via a block allocation table. The block allocation table tracks the allocated blocks, the memory element allocation to a port pair, the association of a block to a queue element and the logical order of the block within the queue element. The block allocation table can be maintained by software or hardware. When additional channels are activated and the additional channels are associated with different port pairs, the switching element must allocate new memory elements to port pairs.

Channels activated on an already active port pair can be allocated blocks of memory from an already allocated memory element. When no blocks are available within the already allocated memory element, because they are taken by other queue elements, the switching element must allocate a new memory element to the port pair. As channels are de-activated, the switching element must de-allocate the blocks of memory. Once all blocks of a memory element have been de-allocated, the switching element can de-allocate the memory element itself, making it available to other port pairs.

This repeated process of channel activation and de-activation can cause the range of available memory to become sparsely allocated, or partially allocated. When the available memory becomes sparsely allocated, allocated blocks of memory are non-contiguous, which can leave a port pair with more than 1 memory element allocated but with only a few blocks allocated in each memory element. Some switching elements also support re-sizing of queues as the data stream characteristics change. The re-sizing of queues, combined with channel activation and de-activation, can also result in the available memory becoming sparsely allocated, or fragmented. After a memory element is allocated to a port pair, a block of memory in the memory element is further allocated to a channel on the port pair, or to a queue servicing the channel.

Known memory defragmentation approaches typically focus on remapping blocks of memory such that all used/allocated blocks are grouped together. However, such known approaches do not take into consideration the association of memory elements with port pairs.

Improvements in memory reallocation in the context of port pairs are therefore desirable.

BRIEF DESCRIPTION OF THE DRAWINGS

Embodiments of the present disclosure will now be described, by way of example only, with reference to the attached Figures.

DETAILED DESCRIPTION

Figure 1:
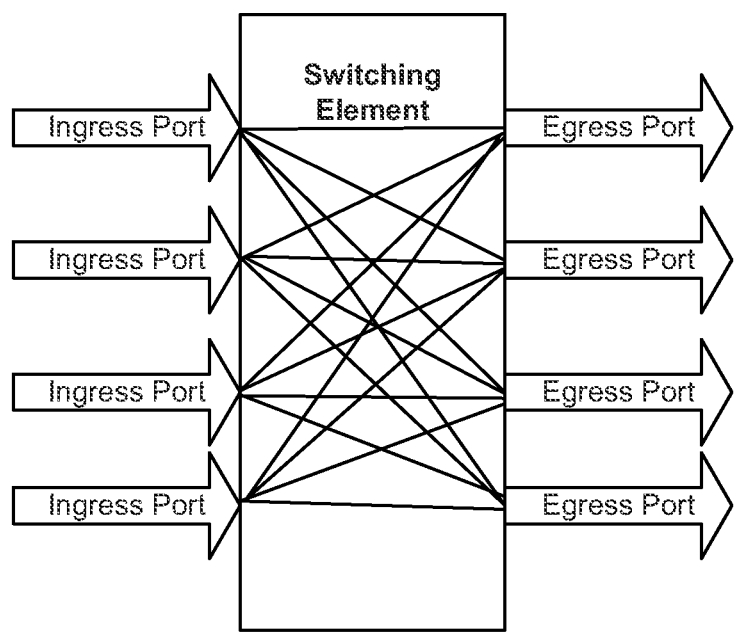
FIG. 1 illustrates a switching element having 4 ingress ports and 4 egress ports.
Figure 2:
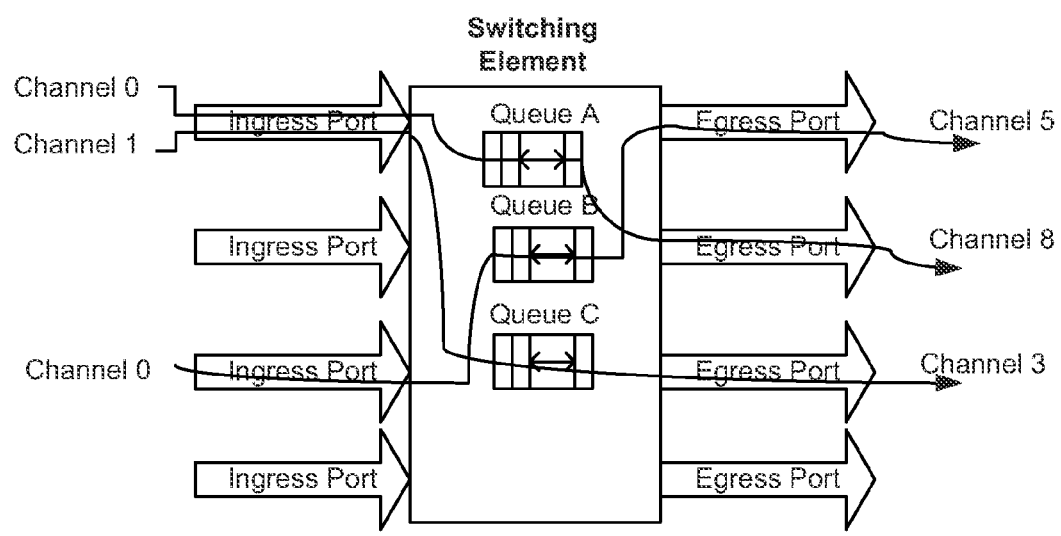
FIG. 2 illustrates a switching element with active channels driving ingress ports, queue elements that store data in transit to an egress channel of an egress port.
Figure 3:
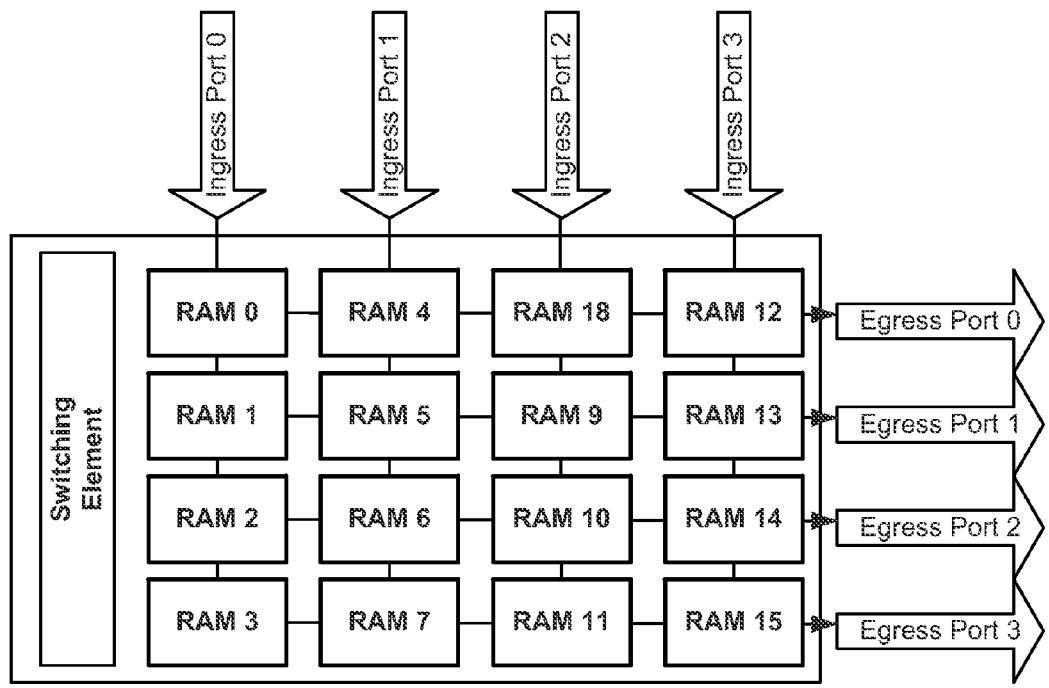
FIG. 3 illustrates a switch element with 16 memory elements, each port pair having 1 memory element allocated thereto.
Figure 4:
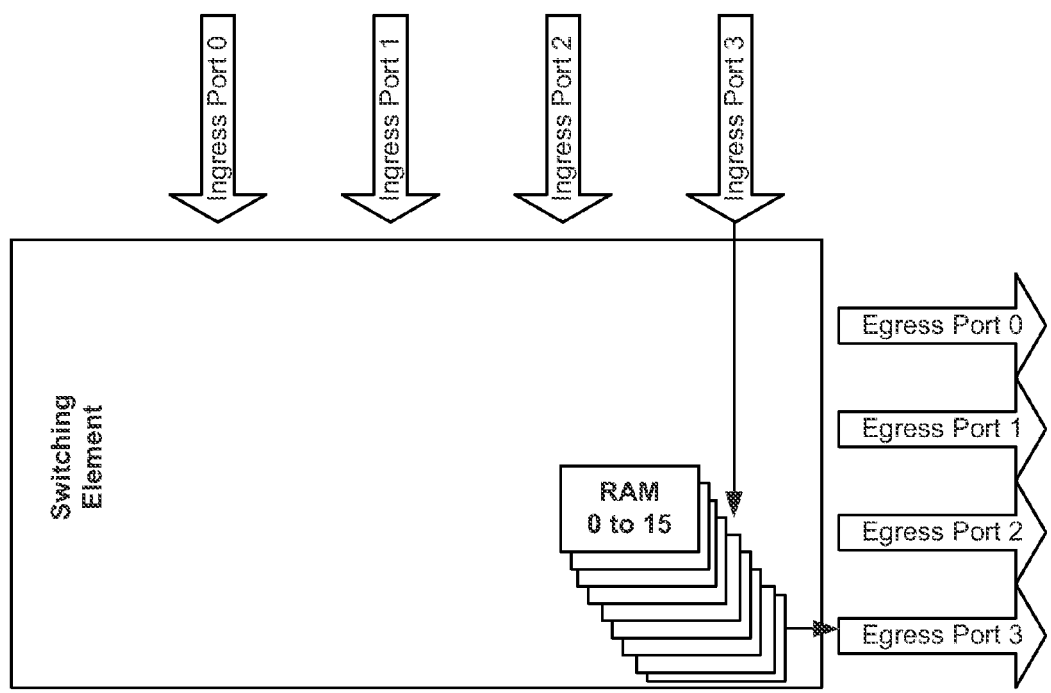
FIG. 4 illustrates a switch element with 16 memory elements in which a single port pair is allocated all available memory elements.

A method of remapping allocated memory in a queue based switching element having first and second memory elements each allocated to a first port pair. An unallocated block of memory is identified in the first memory element as a candidate block, and an allocated block of memory is identified in the second memory element as a target block. Block information is copied from the target block to the candidate block, and the candidate block is maintained as unallocated. In response to a determination that read and write pointers are in a suitable position for a remapping operation, the candidate block is allocated and the target block is deallocated so that the second memory element becomes unallocated and available for reallocation to a second port pair.

Embodiments of the present disclosure relate to a method to remap, or re-allocate, blocks of memory. In an example embodiment, a method remaps blocks of memory without interrupting the flow of data through the queue and also without corrupting the data. In an example embodiment, blocks are mapped to a new location within the existing memory element or to a new memory element. This makes it possible to migrate allocated blocks from one memory element to another, thus potentially freeing up memory elements and resolving fragmented memory allocation. In example embodiments, the method operates on any block within a queue element irrespective of the logical position of the block being targeted for remap.

In an embodiment, the present disclosure provides a method of remapping allocated memory in a queue-based switching element having ingress ports and egress ports. Each path or connection from a selected ingress port to a selected egress port defines a port pair. The queue-based switching element comprises first and second memory elements. The method comprises: identifying an unallocated block of memory in the first memory element as a candidate block, the candidate block being a candidate for allocation, the first memory element being allocated to a first port pair and being associated with a first logical block number; identifying an allocated block of memory in the second memory element as a target block, the target block being a target for deallocation, the second memory element being allocated to the first port pair and being associated with the first logical block number; copying block information from the target block to the candidate block and maintaining the candidate block as unallocated; and in response to a determination that read and write pointers associated with the first logical block number are in a suitable position for a remapping operation, allocating the candidate block and deallocating the target block so that the second memory element becomes unallocated and available for reallocation to a second port pair.

In an example embodiment, allocating the candidate block and deallocating the target block are performed in response to a determination that the read and write pointers are in a suitable position for the remapping operation to complete without affecting contents of a queue associated with the first logical block number.

In an example embodiment, the method further comprises: monitoring read and write pointers to determine whether the read and write pointers are in a suitable position for the remapping operation to complete. In an example embodiment, the method further comprises providing an indication that the read and write pointers are in a suitable position for the remapping operation to complete.

In an example embodiment, the method further comprises determining that the pointers are in the suitable position when: the write pointer is about to advance into the target block; and the read pointer is not within the target block.

In another example embodiment, in which a guard band region is provided adjacent the target block, the method further comprises determining that the pointers are in the suitable position when: the write pointer is about to enter the guard band region; and the read pointer is neither within the target block, nor within the guard band region.

In an example embodiment, the method further comprises reallocating the second memory element to the second port pair.

In an example embodiment, copying the block information comprises copying a port pair identifier, a queue number and a logical block number.

In an example embodiment, the allocated block of memory in the second memory element is a channel-allocated block of memory, allocated to a particular channel of the first port pair.

In an example embodiment, prior to the step of copying, the candidate block is free of queue entries and the target block comprises at least one queue entry.

In another embodiment, the present disclosure provides a non-transitory machine readable medium having stored thereon statements and instructions for execution by a processor to perform a method of remapping allocated memory in a queue-based switching element as described and illustrated herein.

In a further embodiment, the present disclosure provides a method of remapping allocated memory in a queue-based switching element having ingress ports and egress ports, each path or connection from a selected ingress port to a selected egress port defining a port pair, the method comprising: identifying an unallocated block of memory as a candidate block, the candidate block being a candidate for allocation; identifying an allocated block of memory as a target block, the target block being a target for deallocation, the candidate block and the target block each being allocated to a first port pair and being associated with a first logical block number; copying block information from the target block to the candidate block and maintaining the candidate block as unallocated; and in response to a determination that read and write pointers associated with the first logical block number are in a suitable position for a remapping operation, allocating the candidate block and deallocating the target block to enable reallocation of a memory element to a second port pair.

Figure 5:
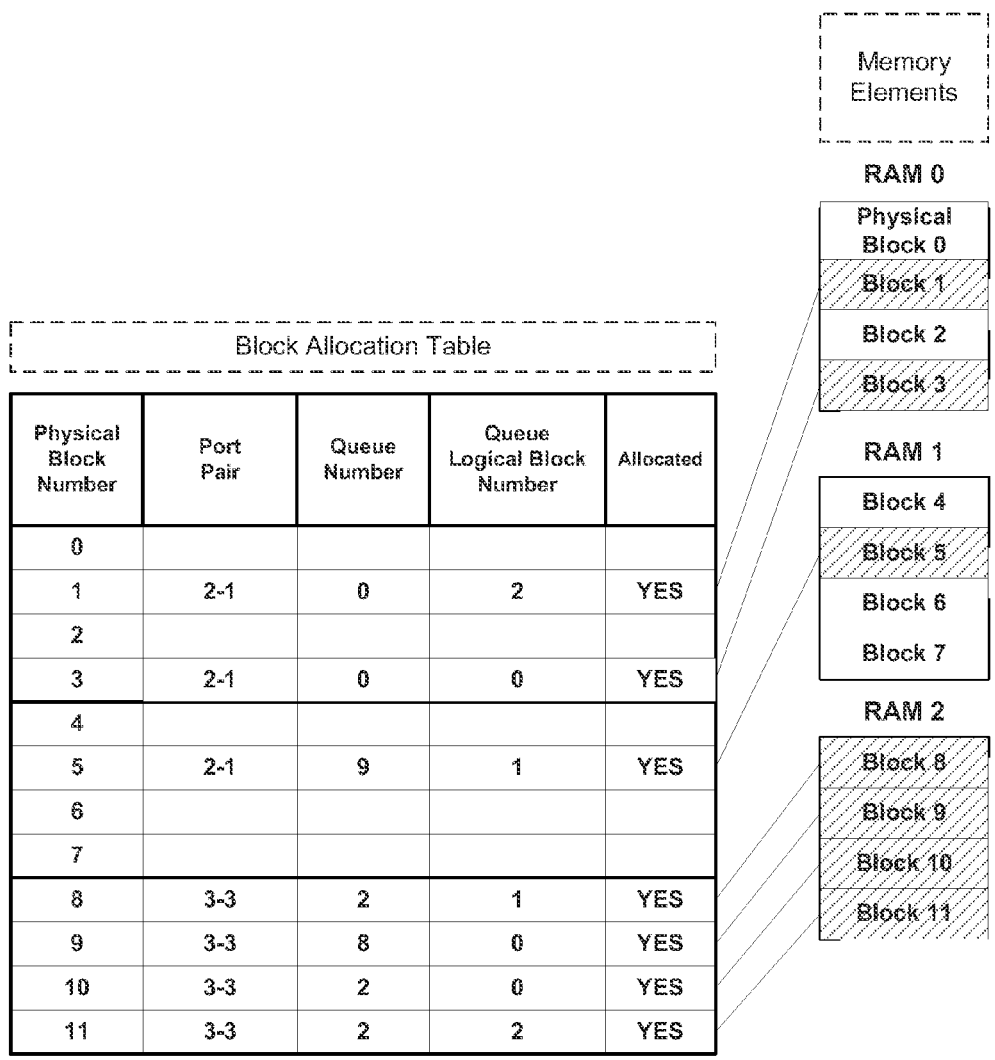
FIG. 5 illustrates a sparsely allocated memory and an associated block allocation table.

FIG. 5 illustrates a sparsely allocated memory and an associated block allocation table. In FIG. 5, the RAM 0 and RAM 1 are each allocated to port pair 2-1, with 2 blocks allocated from RAM 0 and 1 block allocated from RAM 1. As described in further detail below, using a remapping method according to an embodiment of the present disclosure, the 3 allocated blocks shown in FIG. 5 are made to reside within a single memory element, so as to free up a memory element, making it available to other port pairs.

A method according to an example embodiment functions as follows. A currently allocated physical block of memory is selected as the "target" block for remapping, and a new physical block of memory is selected as the "candidate" block. Once the remap operation completes the logical block of a queue element which was previously associated to the target block will be remapped to the candidate block.

Figure 6:
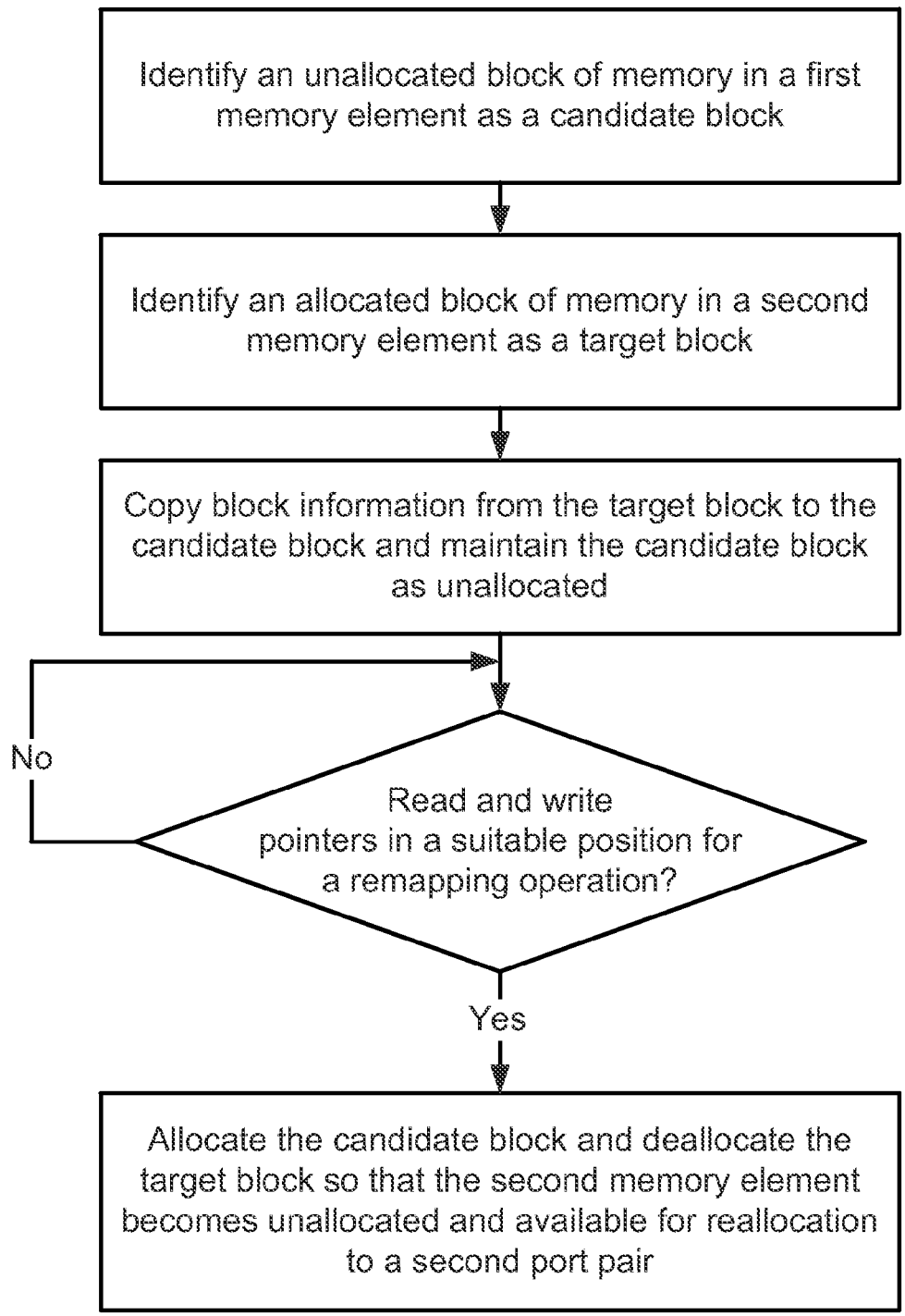
FIG. 6 illustrates a method of remapping allocated memory according to an embodiment of the present disclosure.

FIG. 6 illustrates a method of remapping allocated memory according to an embodiment of the present disclosure. In implementation, the method may include more or fewer steps than indicated. In an example embodiment, many of the steps or actions are performed by queue element logic. In another example embodiment, some steps or actions are performed by the queue element logic, and other steps or actions are performed by memory management hardware/software.

The example embodiment of FIG. 6 is a method of remapping allocated memory in a queue-based switching element having ingress ports and egress ports. Each path or connection from a selected ingress port to a selected egress port defines a port pair, and the queue-based switching element comprises first and second memory elements.

An initial step comprises identifying an unallocated block of memory in the first memory element as a candidate block. The candidate block is a candidate for allocation and can be free of queue entries. The first memory element is allocated to a first port pair and associated with a first logical block number.

A next step comprises identifying an allocated block of memory in the second memory element as a target block. The target block is a target for deallocation and comprises at least one queue entry. The second memory element is allocated to the same first port pair and associated with the same logical block number as the first memory element. In an example embodiment, the allocated block of memory is a channel-allocated block of memory, allocated to a particular channel of the first port pair, or to a queue element servicing the channel.

A further step comprises copying block information from the target block to the candidate block and maintaining the candidate block as unallocated. The block information can comprise the port pair identifier, the queue number and the logical block number of the target block. In an example embodiment, prior to the step of copying, the candidate block is free of queue entries and the target block comprises at least one queue entry. In an example embodiment, prior to the step of copying, the second memory element comprises allocated blocks of memory and unallocated blocks of memory.

A subsequent step comprises, in response to a determination that read and write pointers associated with the first logical block number are in a suitable position for a remapping operation, allocating the candidate block and deallocating the target block so that the second memory element becomes unallocated and available for reallocation to a second port pair. In an example embodiment, allocating the candidate block comprises marking the candidate block as allocated, and deallocating the target block comprises marking the target block as unallocated. In another embodiment, the method comprises determining that the read and write pointers are in a suitable position for the remapping operation, as will be described in further detail in the following examples.

While the candidate block and the target block are described in the embodiment of FIG. 6 as being in different memory elements, in another embodiment the target and candidate blocks can be in the same memory element. In such an example embodiment, the method comprises: identifying an unallocated block of memory as a candidate block, the candidate block being a candidate for allocation; identifying an allocated block of memory as a target block, the target block being a target for deallocation, the candidate block and the target block each being allocated to a first port pair and being associated with a first logical block number; copying block information from the target block to the candidate block and maintaining the candidate block as unallocated; and in response to a determination that read and write pointers associated with the first logical block number are in a suitable position for a remapping operation, allocating the candidate block and deallocating the target block to enable reallocation of a memory element to a second port pair.

FIGS. 7-13 illustrate the effects on a block allocation table and on memory elements of steps or actions in a method according to an embodiment of the present disclosure. In an example embodiment, the method comprises four steps. In an example embodiment in which the switching element comprises queue element control logic and memory management software/hardware, step 1 is performed by the memory management software, step 3 is performed by the queue element control logic, step 2 involves sending information from the memory management hardware/software to the queue element control logic, and step 4 involves sending information from the queue element control logic to the memory management hardware/software.

The 1st step of the method is to select a candidate and target block. The target block is already allocated and marked as "allocated" in the block allocation table. The target block entry in the block allocation table is already programmed with the "port pair", "queue number" and the "logical block number". Since the candidate block will be taking the place of the target block, the candidate block entry of the block mapping table is programmed with the same values as the target block for the "port pair", "queue number" and "logical block number". For example, the "port pair", "queue number" and "logical block number" values are copied from the target block to the candidate block, but the candidate block remains inactive.

Figure 7:
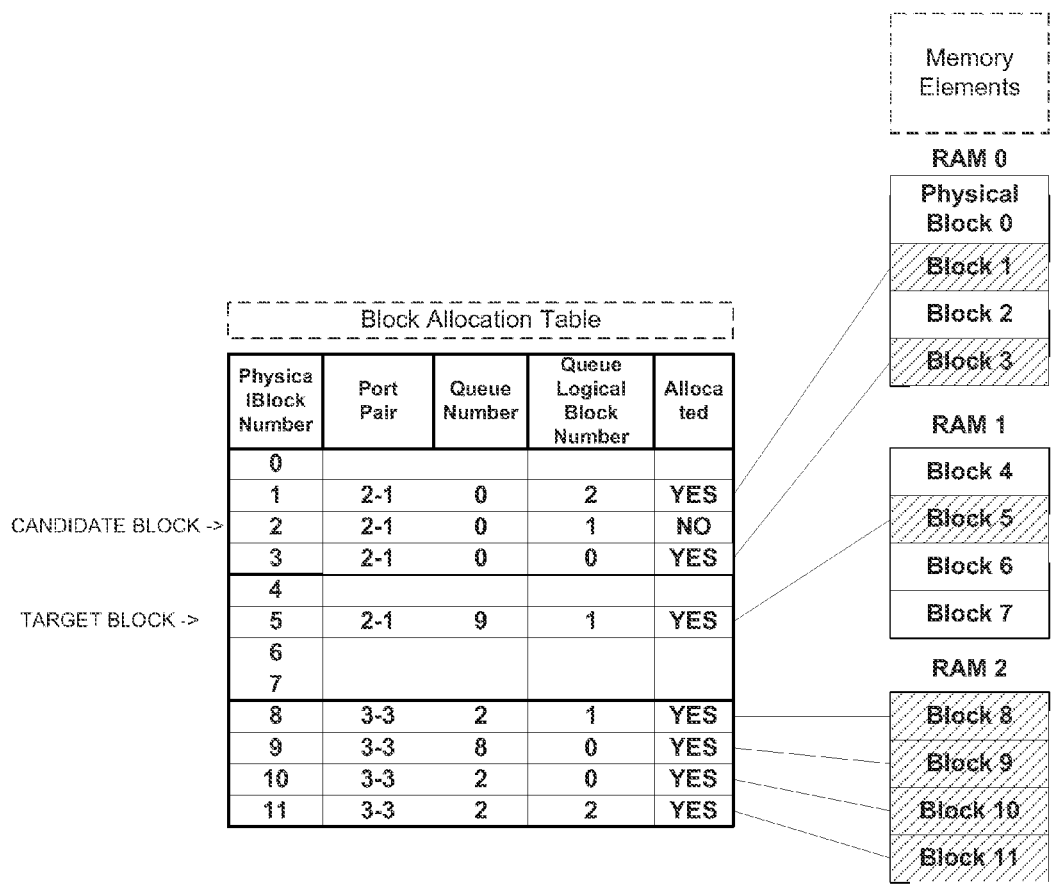
FIG. 7 illustrates an example embodiment of a first step in a method of remapping allocated memory according to an embodiment of the present disclosure.

FIG. 7 illustrates an example embodiment of the 1st step where block 5 from memory element 1 is selected as the target block, and block 2 from memory element 0 is selected as the candidate block. Block 5 is currently associated to port pair 2-1, queue number 0, and logical block 1. The candidate block table entry is programmed identically with port pair 2-1, queue number 0, and logical block 1. The candidate block remains marked as "not allocated", while the target block remains marked as "allocated".

Figure 8:
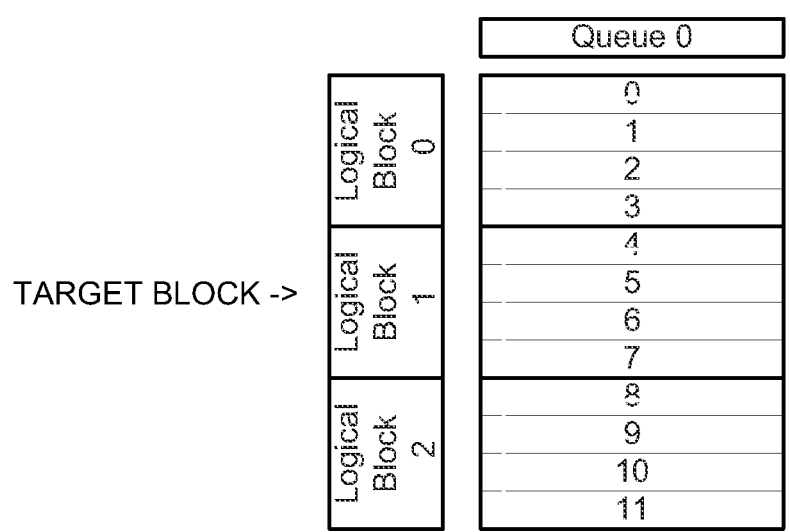
FIG. 8 illustrates an example embodiment of a second step in a method of remapping allocated memory according to an embodiment of the present disclosure.

The 2nd step of the method is to forward the logical block number for the target and candidate to the queue element control logic. FIG. 8 illustrates an example embodiment of the 2nd step where logical block 1 is the target block. This particular queue element 0, has 3 blocks currently allocated to it. Each block can store 4 entries.

The 3$^{rd}$ step of the method is for the queue element logic to monitor the queue read and write pointers and to provide an indication that the pointers are in a suitable position for the remap operation to complete so as to not affect the contents of the queue. The method operates while the queue is servicing data (active traffic). When a queue receives data, the write pointer will advance. When a queue forwards data to a destination, the read pointer will advance. The queue logic determines that the pointers are in a suitable position whenever the following 2 conditions are met: 1) the write pointer is about to advance into the target block, e.g. position 3; and 2) the read pointer is not within the target block. This guarantees that no currently active data are stored within the target block while the remap function is being performed.

In some systems, where the write and read pointers are moving rapidly, the pointers can move before the remap operation is complete. In these systems, it is necessary to provide a guard band region before the target block. In this case, the queue logic determines that the pointers are in a suitable position whenever the following 2 conditions are met: 1) the write pointer is about to enter the guard band region and 2) the read pointer is not within the target block, nor the guard band region. This guarantees that no currently active data are stored within the target block while the remap function is being performed.

Figure 9:
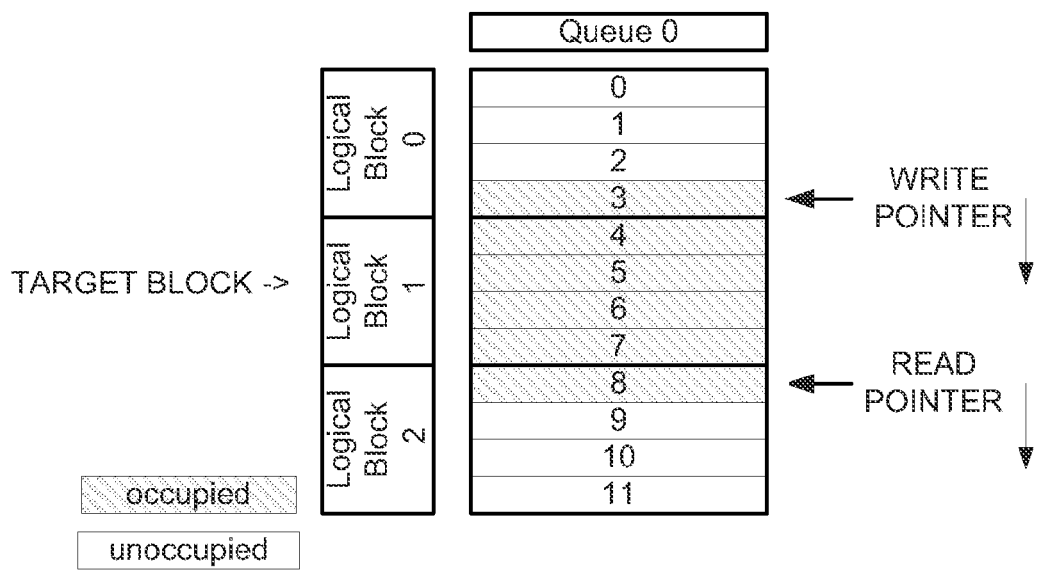
FIG. 9 illustrates an example in which read and write pointers are in a suitable position for remapping.

FIG. 9 illustrates an example in which read and write pointers are in a suitable position for remapping. In this example the write pointer is on location 3, the last entry of logical block 0 and is advancing to location 4 the first entry of the target block, logical block1. The read pointer is on location 8, just outside of the target block memory range.

Figure 10:
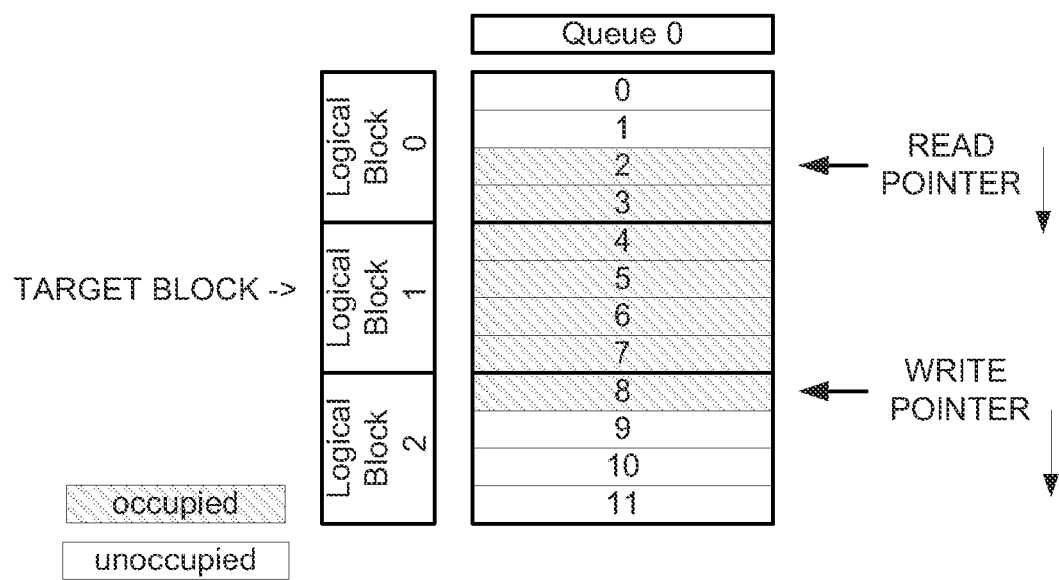
FIG. 10 illustrates an example in which read and write pointers are in an unsuitable position for remapping.

FIG. 10 illustrates an example in which read and write pointers are in an unsuitable position for the remapping to occur.

Figure 11:
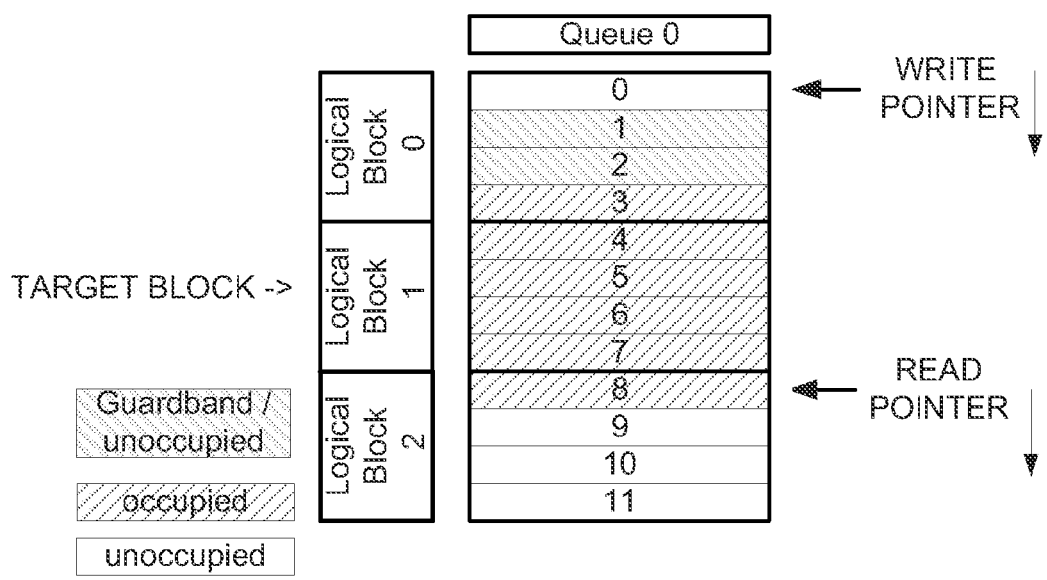
FIG. 11 illustrates a guard band example in which read and write pointers are in a suitable position for remapping.
Figure 12:
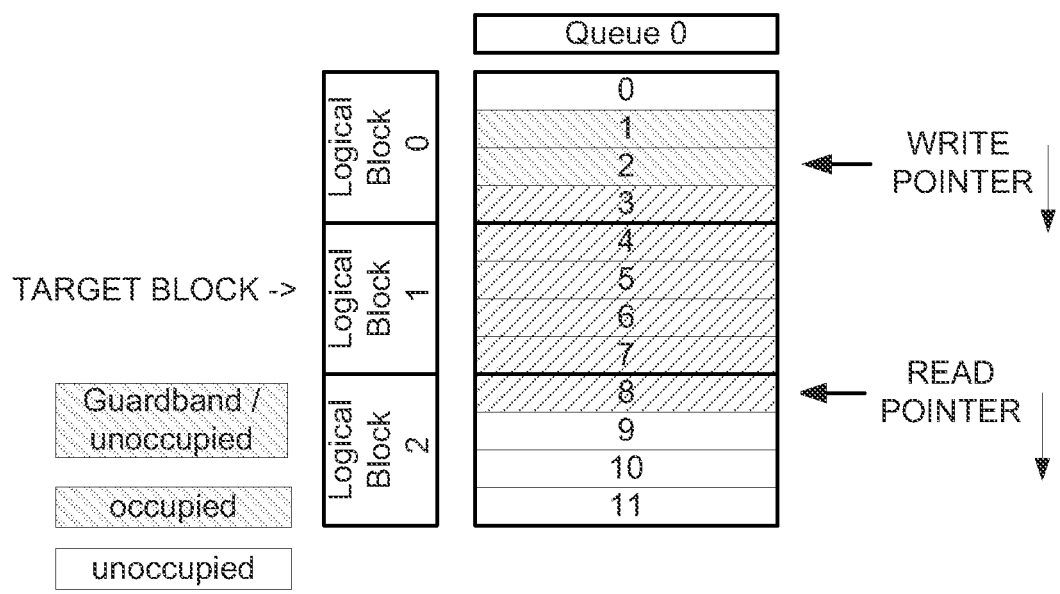
FIG. 12 illustrates a guard band example in which read and write pointers are in an unsuitable position for remapping.

FIG. 11 illustrates a guard band example in which read and write pointers are in a suitable position for remapping. FIG. 12 illustrates a guard band example in which read and write pointers are in an unsuitable position for remapping.

The 4th step of the method is for the queue logic to signal that the pointers are in a suitable position and for the block allocation table to be updated. In this step, the target physical block is marked as "not allocated" and the candidate physical block is marked as "allocated".

Figure 13:
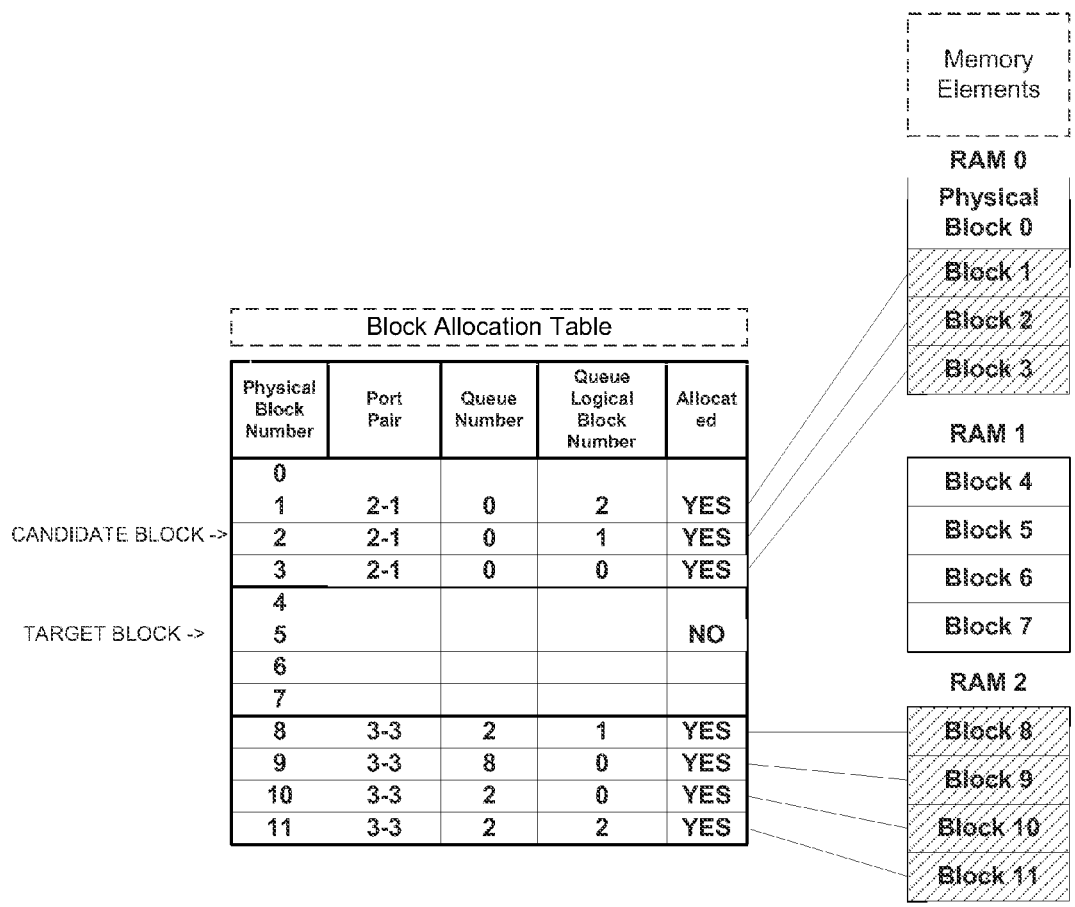
FIG. 13 illustrates an example embodiment of a fourth step in a method of remapping allocated memory according to an embodiment of the present disclosure.

FIG. 13 illustrates an example embodiment of a 4th step where block 5 from memory element 1 was selected as the target block, and block 2 from memory element 0 was selected as the candidate block. The queue logic has signaled that the pointers are in a suitable position, this has caused the block 5 to be marked as "not allocated" and block 2 to be marked as "allocated". The figure shows that memory element 1 is now unallocated and available for a different port as needed. Furthermore the logical blocks of queue 0, port pair 2-1, are all packed within memory element 0.

In an example embodiment, the method further comprises reallocating memory element 1 to a different port pair.

Embodiments of the present disclosure enable remapping of any block to any other block while traffic is being processed. Steps in a method according to an embodiment of the present disclosure are performed by the queue element logic. In another embodiment, some steps are performed by the queue element logic, and some are performed by the associated memory management software or memory management hardware.

Embodiments of the present disclosure are tied to port pair memory sharing, and to freeing up a memory element so that it is available for a port pair.

As queues are provisioned and de-provisioned, memory can become fragmented such that pages are only partially allocated (i.e.: unallocated blocks present in page). Freeing up the partially allocated pages is important as other port pairs may require additional blocks, and memory can be fragmented such that no pages are free. Being able to hitlessly remap a logical block from one physical block address to a new physical block address allows the migration of blocks from one page to another. When all blocks have been moved away from a Page, that Page can be re-allocated to a different port pair.

In an example implementation, queue element logic has an input port, and can receive a logical block number and a request to perform a remap. In another implementation, the queue element logic receives the logical block number for the target from the block allocation table, and it can respond back indicating the right time to do the remap.

In an example implementation, an embedded processor running on a chip generates the request to perform a remap, or it could be on the network and controlling it from afar. In an example implementation, the memory management software referred to herein is the same memory management software used to provision and deprovision channels.

A method according to an embodiment of the present disclosure facilitates remapping, from a second memory element to a first memory element, blocks allocated to a first port pair, so that the allocated blocks of the first port pair all reside within the first memory element, freeing up and unallocating the second memory element, making it available for reallocation to a second port pair.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of remapping allocated memory in a queue-based switching element having ingress ports and egress ports, each path or connection from a selected ingress port to a selected egress port defining a port pair, the queue-based switching element comprising first and second memory elements, the method comprising:
    identifying an unallocated block of memory in the first memory element as a candidate block, the candidate block being a candidate for allocation, the first memory element being allocated to a first port pair and being associated with a first logical block number;
    identifying an allocated block of memory in the second memory element as a target block, the target block being a target for deallocation, the second memory element being allocated to the first port pair and being associated with the first logical block number;
    copying block information from the target block to the candidate block and maintaining the candidate block as unallocated; and
    in response to a determination that read and write pointers associated with the first logical block number are in a suitable position for a remapping operation, allocating the candidate block and deallocating the target block so that the second memory element becomes unallocated and available for reallocation to a second port pair.

2. The method of claim 1, wherein allocating the candidate block and deallocating the target block are performed in response to the determination that the read and write pointers are in the suitable position for the remapping operation to complete without affecting contents of a queue associated with the first logical block number.

3. The method of claim 1, further comprising:
    monitoring the read and write pointers to determine whether the read and write pointers are in the suitable position for the remapping operation to complete.

4. The method of claim 3, further comprising providing an indication that the read and write pointers are in the suitable position for the remapping operation to complete.

5. The method of claim 3, further comprising determining that the pointers are in the suitable position when:
    the write pointer is about to advance into the target block; and
    the read pointer is not within the target block.

6. The method of claim 3, wherein a guard band region is provided adjacent the target block, the method further comprising determining that the pointers are in the suitable position when:
    the write pointer is about to enter the guard band region; and
    the read pointer is neither within the target block, nor within the guard band region.

7. The method of claim 1, further comprising reallocating the second memory element to the second port pair.

8. The method of claim 1, wherein copying the block information comprises copying a port pair identifier, a queue number and a logical block number.

9. The method of claim 1, wherein the allocated block of memory in the second memory element is a channel-allocated block of memory, allocated to a particular channel of the first port pair.

10. The method of claim 1, wherein, prior to the step of copying, the candidate block is free of queue entries and the target block comprises at least one queue entry.

11. A non-transitory machine readable medium having stored thereon statements and instructions for execution by a processor to perform a method of remapping allocated memory in a queue-based switching element having ingress ports and egress ports, each path or connection from a selected ingress port to a selected egress port defining a port pair, the queue-based switching element comprising first and second memory elements, the method comprising:
    identifying an unallocated block of memory in the first memory element as a candidate block, the candidate block being a candidate for allocation, the first memory element being allocated to a first port pair and being associated with a first logical block number;
    identifying an allocated block of memory in the second memory element as a target block, the target block being a target for deallocation, the second memory element being allocated to the first port pair and being associated with the first logical block number;

copying block information from the target block to the candidate block and maintaining the candidate block as unallocated; and in response to a determination that read and write pointers associated with the first logical block number are in a suitable position for a remapping operation, allocating the candidate block and deallocating the target block so that the second memory element becomes unallocated and available for reallocation to a second port pair.

12. The non-transitory machine readable medium of claim 11, wherein, in the method, allocating the candidate block and deallocating the target block are performed in response to the determination that the read and write pointers are in the suitable position for the remapping operation to complete without affecting contents of a queue associated with the first logical block number.

13. The non-transitory machine readable medium of claim 11, wherein
the method further comprises:
monitoring the read and write pointers to determine whether the read and write pointers are in the suitable position for the remapping operation to complete.

14. The non-transitory machine readable medium of claim 13, wherein
the method further comprises providing an indication that the read and write pointers are in the suitable position for the remapping operation to complete.

15. The non-transitory machine readable medium of claim 13, wherein the method further comprises determining that the pointers are in the suitable position when:
the write pointer is about to advance into the target block; and
the read pointer is not within the target block.

16. The non-transitory machine readable medium of claim 13, wherein a guard band region is provided adjacent the target block, and wherein the method further comprises determining that the pointers are in the suitable position when:
the write pointer is about to enter the guard band region; and
the read pointer is neither within the target block, nor within the guard band region.

17. The non-transitory machine readable medium of claim 11, the method further comprising reallocating the second memory element to the second port pair.

18. The non-transitory machine readable medium of claim 11, wherein, in the method, copying the block information comprises copying a port pair identifier, a queue number and a logical block number.

19. The non-transitory machine readable medium of claim 11, wherein the allocated block of memory in the second memory element is a channel-allocated block of memory, allocated to a particular channel of the first port pair.

20. The non-transitory machine readable medium of claim 11, wherein, prior to the step of copying, the candidate block is free of queue entries and the target block comprises at least one queue entry.

21. A method of remapping allocated memory in a queue-based switching element having ingress ports and egress ports, each path or connection from a selected ingress port to a selected egress port defining a port pair, the method comprising:
identifying an unallocated block of memory as a candidate block, the candidate block being a candidate for allocation;
identifying an allocated block of memory as a target block, the target block being a target for deallocation, the candidate block and the target block each being allocated to a first port pair and being associated with a first logical block number;
copying block information from the target block to the candidate block and maintaining the candidate block as unallocated; and
in response to a determination that read and write pointers associated with the first logical block number are in a suitable position for a remapping operation, allocating the candidate block and deallocating the target block to enable reallocation of a memory element to a second port pair.

\* \* \* \* \*